United States Patent
Buda et al.

[11] Patent Number: 5,449,877
[45] Date of Patent: Sep. 12, 1995

[54] PROGRESSIVE POWER MONITOR FOR A CURRENT CONTROLLED RESISTANCE WELDER

[75] Inventors: Paul R. Buda, Raleigh, N.C.; Mark A. Hinton, Elgin, S.C.

[73] Assignee: Square D Company, Palatine, Ill.

[21] Appl. No.: 175,036

[22] Filed: Dec. 29, 1993

[51] Int. Cl.⁶ .............................................. B23K 11/24
[52] U.S. Cl. .................................................... 219/110
[58] Field of Search ................ 219/108, 109, 110, 111

[56] References Cited

U.S. PATENT DOCUMENTS

| | | | |
|---|---|---|---|
| 3,445,621 | 5/1969 | Schomer | 219/111 |
| 3,546,421 | 12/1970 | Meyer et al. | 219/110 |
| 4,516,008 | 5/1985 | Jones | 219/110 |
| 4,945,201 | 7/1990 | Ito et al. | 219/110 |
| 5,083,003 | 1/1992 | Clark, Jr. et al. | 219/110 |

Primary Examiner—Clifford C. Shaw
Attorney, Agent, or Firm—Larry I. Golden; Michael J. Femal; Richard J. Graefe

[57] ABSTRACT

A weld controller utilizing a constant current control employs a stepper program for increasing current boost in predetermined percentage increments or steps following a predetermined stepper current profile to provide compensation for contact tip wear. The weld controller acquires weld power data in the form of current and voltage samples for each step of the stepper program, and computes Volt Amperes or power from this data during an acquisition run through the stepper program. The stepper program specifies a constant current at each step. Associated with each incremental current step, weld power that is required to produce that weld current is determined by the weld controller to generate a characteristic power curve. The power curve will be over the range of currents as specified by the combination of the programmed weld current and the range of current boost as specified by the stepper schedule. The weld controller will build a table of values relating weld current and delivered power or Volt Amperes. Once this table is complete, the table is available for an operator to edit, view, or copy into a characteristic power curve file for the weld system. Subsequent operations of the weld controller will utilize high and low power limit thresholds that track the nominal power profile. An event condition will be declared if the weld power is outside the lower or upper threshold. The thresholds can be defined as a fixed offset from the profile or as a percentage of the profile at each step of the stepper program. This allows the use of power limits to be established in close proximity to the nominal weld power at all times, enabling the use of tighter tolerances.

23 Claims, 7 Drawing Sheets

PROGRESSIVE POWER MONITOR FOR A CURRENT CONTROLLED RESISTANCE WELDER

DESCRIPTION

1. Technical Field

Applicants' invention relates generally to the field of weld controllers and more particularly to a microprocessor based weld controller system for controlling the amount of power supplied by the weld controller to electrodes of the weld controller for a targeted weld current during the life of the electrodes.

2. Background Art

Two critical parameters effect the quality and consistency of a weld between two or more work pieces, weld gun pressure and the current density in the region to be welded. Weld gun pressure is readily regulated by pneumatic, hydraulic, or other mechanical means. Current density regulation requires an electronic solution. Many methods have been utilized to regulate and maintain the current density constant within the contact area between weld gun contact tips and the material to be welded. As the contact tips deteriorate, the contact area increases, resulting in a decrease in the current density at the weld nugget. This results in a decreased heat input and can result in weld defects. Compensation for this decrease in current density over the life of the tips can be accomplished through several different methods to increase or boost the current. Less heat and thus less current, is required during the first or early stage of the contact tips' life. Once the contact tips have settled in, during a second stage, a gradual increase in heat is required. During the last stage, as the contact tips start to deform, even more heat is required. These three stages form a user profile for the current or heat boost.

Earlier weld controllers modified the firing angle of SCR switches to regulate the conduction angle of the SCRs to a particular percentage of full or 180 degree conduction. This mode of operation, known as a voltage compensation method, does not regulate current directly. A second method measures the available heat as a function of the overall system power factor, and provides a user programmed percentage of that available heat following a profile based on the above mentioned three stages of the contact tip lifetime. This method will or could provide for line voltage variations but again does not regulate current directly. The user adjusts either the percent conduction angle or the percent heat in either of these methods to achieve a desired weld current as measured by external means.

Some weld controllers provide a third method which uses a constant current control which will adjust the firing angle of the SCRs to maintain a predetermined current flow to the contact tips based on the user profile. The use of stepper programs accommodates contact tip deformation by increasing the current in equal increments according to a user profile. Some prior art weld controllers employ a manual stepper to adjust for the current boost, which typically is increased as a series of scheduled linear steps as specified by a weld engineer to obtain metallurgically sound welds during the life of the weld contact tips. For example, the first stage may be programmed to reach a 5 percent current boost in one percent increments after 200 weld cycles, the second stage may be programmed to reach a 10 percent current boost after 2000 weld cycles, and the last stage may be programmed for a 15 percent current boost after 8000 weld cycles. Commonly assigned U.S. Pat. No. 5,083,003 discloses an adaptive stepper which increases the heat boost and thus the current density as a function of not only the number of weld cycles but also as a function of expulsions. Expulsions, also known as spitting, generally indicate that too much heat is being applied during the weld cycle. Molten material is blown away from the weld zone during expulsion, resulting in a significant drop in resistance at the primary of the weld transformer supplying the contact tips.

Although the adaptive stepper is effective in adjusting the welding heat boost to compensate for deterioration of the contact tips, the weld controller is more complex, often requiring a coprocessor for the many calculations required. In addition, it becomes difficult to utilize a current limit feature that can be used to detect process variations in the welding cycle that could indicate other fault conditions. These variations occur as a result of either short term or long term impedance changes in the welder system. Short term changes are caused by variations in the workpiece and contact tip interface such as oxidation of the surface of the workpieces or poor part fitup. Long term effects are associated with tool or weld cable degradation or poor connections. With the first and second methods, this increased impedance will result in lower weld current. In the third method, the weld controller will attempt to directly compensate for the increase and regulate the current to maintain it at the constant, preset level, providing more and more power to the weld system, with possible expulsions occurring. The user would have no indication of a problem until it may be too late, as the system would have to detect an inability to regulate current before error messages are generated. At that time, it would only indicate a failure of the control to regulate the weld current, which could be from many sources. There would be no indication of a change in system impedances. The current controlled system will continue to make metallurgically sound welds until it fails catastrophically from lack of maintenance. A method to indicate changes in system impedances is therefore desirable.

SUMMARY OF THE INVENTION

Accordingly, the principal object of the present invention is to provide a weld controller having a system for detecting and reporting changes in system impedances.

A further objective of the invention is to provide an apparatus for acquiring weld current and voltage data samples during welding operations, including acquisition, measurement, and conversion of the data for each weld cycle of a weld schedule during the lifetime of a set of contact tips.

Yet a further objective of the invention is to provide an apparatus for calculating the power or Volt-Amperes (VA) from the weld current and voltage data samples required to supply a particular weld current as a function of the weld schedule.

Still a further objective of the invention is to provide an apparatus for using sampled data techniques to establish a characteristic power profile from the data samples for the weld schedule, the profile having a nominal weld power point for comparing with actual weld power for each weld cycle.

In the preferred embodiment of the invention, the invention is comprised of a system of elements including, but not limited to a stepper weld controller as is disclosed in commonly assigned U.S. Pat. No. 4,945,201. The user programmed stepper provides compensation for the decreased weld current density caused by the flattening of the weld contact tips through the life of the contact tips. The system will use current regulation to maintain weld current constant for each step of a user programmed stepper profile. During an acquisition run, the system acquires weld current data by means of a current transformer in the primary or secondary circuit of the welder. A potential transformer allows line voltage to be sensed. Analog to digital converters provide the required conversion of the output current and the input voltage to signals suitable for inputting to a microprocessor based (CPU) weld controller. The CPU reduces these signals to generate a current sample and voltage sample for each current boost step performed by the stepper program.

Following the stepper profile, weld power for each step is either measured directly or is calculated from the weld transformer RMS voltage, current, and power factor. The acquired data is stored as a table of values relating the power or VA required to supply a particular primary or secondary current of a welding transformer to that primary or secondary current such that a characteristic power curve for a particular tool is established. The table of values can also be modified manually for fine tuning of the system. Once the characteristic power curve exists, the weld controller, in subsequent operations, will compare the actual weld power or VA with the characteristic power curve at each weld cycle and will indicate an event condition, as defined below, if the actual weld power differs from the characteristic power by a predetermined value. These values are defined as values relative to the characteristic power curve profile and could be defined as limits having a fixed offset or a proportional offset. The calculation of the limit threshold relative to the characteristic power profile may be readily expanded to include other forms of relative values. The object of the invention is not restricted to a particular relative value calculation. The thresholds at any weld current set point are therefore values relative to the characteristic power curve profile which represents the expected power at each step of the stepper current density compensation. Once established, the table of values will form a characteristic curve or nominal power profile which characterizes the stepper and the complete weld process equipment, including the weld transformer, cables, weld gun, weld contact tips, and so on, in use.

Other features and advantages of the invention, which are believed to be novel and nonobvious, will be apparent from the following specification taken in conjunction with the accompanying drawings in which there is shown a preferred embodiment of the invention. Reference is made to the claims for interpreting the full scope of the invention which is not necessarily represented by such embodiment.

DETAILED DESCRIPTION

Although this invention is susceptible to embodiments of many different forms, a preferred embodiment will be described and illustrated in detail herein. The present disclosure exemplifies the principles of the invention and is not to be considered a limit to the broader aspects of the invention to the particular embodiment as described.

Figure 1:
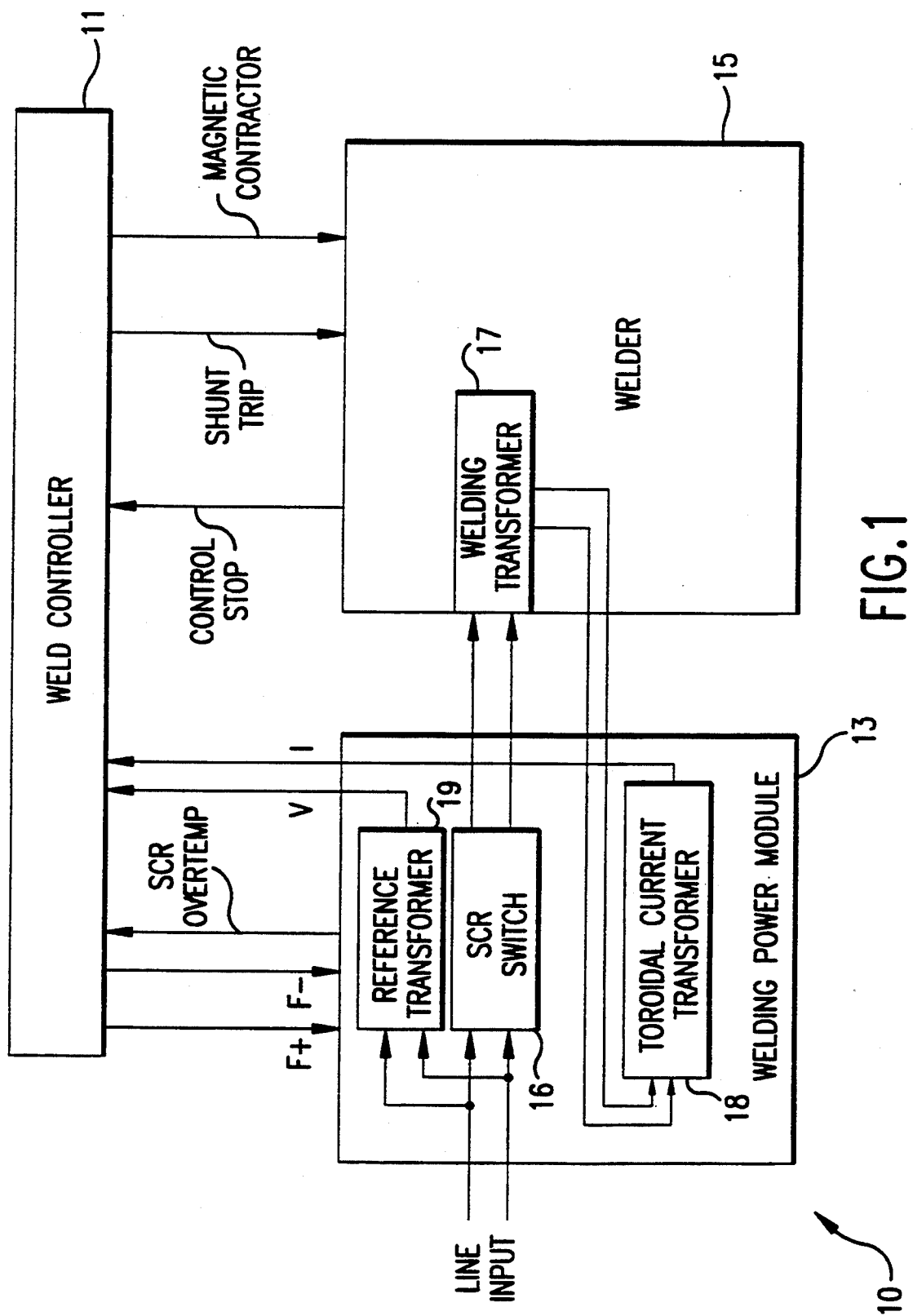
FIG. 1 is a block overview diagram showing a welder and weld controller system.

FIG. 1 illustrates a typical welder system 10 consisting of a weld controller 11, welder power module 13, and welder 15. Weld controller 11 generates firing signals F+ and F— used to energize or turn on SCR switch 16 which is coupled to welding transformer 17 to supply power to contact tips and the workpiece being welded. The primary current of welding transformer 17 is monitored by using a toroidal current transformer 18 coupled to its primary circuit. A reference transformer 19 monitors the incoming line input voltage. In addition to voltage V and current I signals, weld controller 11 receives an over-temperature signal from the SCR switch 16 for use in control algorithms within the weld controller 11 as a protective feature to control or shutdown the welder 10 if the SCR switch reaches a predetermined temperature. Specific implementation details of welder system 10 may be found in U.S. Pat. No. 4,945,201, although such details are not necessarily required for a correct understanding of the present invention.

Figure 2:
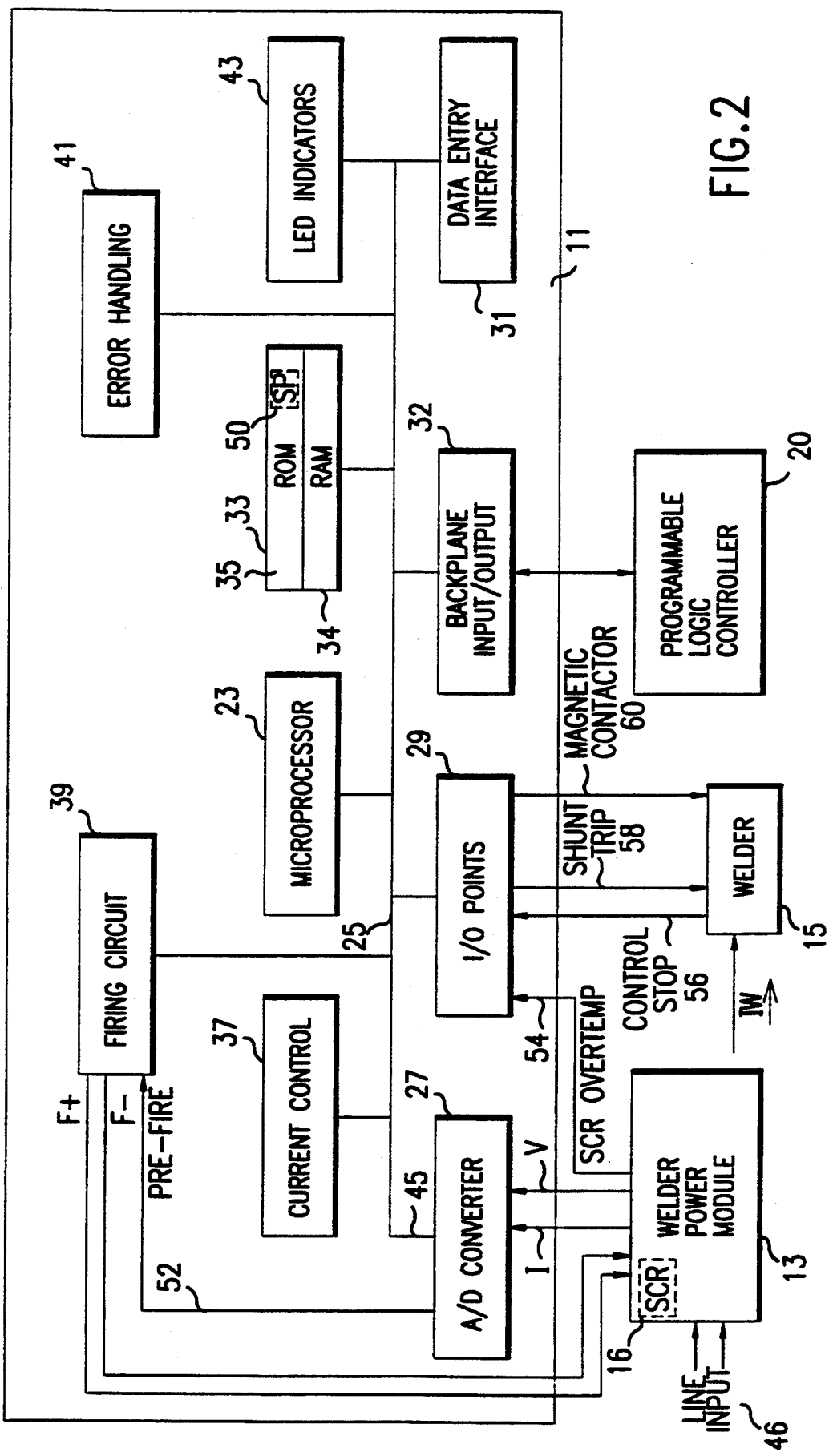
FIG. 2 is a detailed block diagram showing a welder and weld controller system implementing a progressive power limit control according to the present diagram.

Referring to FIG. 2, a block diagram details a welder 15 and weld controller 11 implementing a progressive current limit control according to the present invention. The weld controller 11 may be part of a larger system controlled by programmable logic controller (PLC) 20 or it may be self-contained. A backplane interface 22 provides a means of coupling the PLC 20 to microprocessor (CPU) 23 to a data bus 25. CPU 23 is also coupled via data bus 25 to A/D converter 27, input/output interface 29, data entry interface 31, memory 33 comprising both RAM 34 and ROM 35, firing circuit 39, and LED indicators 43. LED indicators 43 provide status information of the weld controller 11. Control and timing signals required for operation of the CPU 23 are not shown as they are well known to those skilled in the art and not an object of the present invention. A program stored in ROM 35, similar to a program as disclosed in U.S. Pat. No. 4,516,008 provides control of the power module 13 and welder 15 and the welding process by operation of CPU 23. This program will generate SCR firing signals F+ and F— through firing circuit 39 to control the weld sequence in response to various input signals. The present invention improves the referenced program and other types of welder controls by adding a method of monitoring weld current Iw and line voltage V and computing weld power or Volt- Amperes during the life of contact tips within the welder 15, as will be described below.

A two channel A/D converter 27 converts analog signals I and V from welder power module into digitalized signals 45 which represent welding transformer 17 primary weld current Iw and power line input voltage 46, respectively. Input voltage is from a regulated voltage source. The digitalized signals 45 are placed on bus 25 for storage in RAM 34 and for use as feedback control signals in execution of a weld control program 50 resident in ROM 35. The A/D converter 27 also generates a prefire signal 52 for inputting to firing circuit 39. An enable signal is also generated by control program 50 to prevent erroneous firing due to a possible program "hang-up" since two actions, prefire and enable, are required before the firing signals F+, F− are generated. Details regarding the firing circuit 39 and A/D converter 27 are well known and will therefore not be described further.

The input/output interface 29 receives an input 54 from welder power module 13 if the temperature of the SCR switches 16 reaches a predetermined set point, indicative of an overtemperature condition. The temperature is monitored every weld cycle and if it reaches the set point, input 54 will cause the control program 50 to disable the weld current Iw and put an error message in error handling 41 which is actually a portion of the weld control program 50 in ROM 35. Control stop signal 56 is a signal generated within welder 15 as an interlock control and will be activated if an operator or an external device causes the interlock to open. Again, this signal 56 will cause the control program 50 to disable the weld current Iw and put an error message in the error handling 41. The external device is normally a palm button that is depressed to indicate an emergency condition that requires an immediate cancellation of the welding cycle. Since a shorted SCR switch 16 would result in continuous current to the welder 15, a shunt trip circuit breaker is placed in series within welder 15 to remove power if a shorted SCR condition occurs. This condition is assumed to exist if current 1 is sensed at a time when it has not been commanded by the welder control 11. The welder control 11 will generate a shunt trip signal 58 to cause the circuit breaker to trip out under the shorted SCR condition. An additional output 60 controls a magnetic contactor for use within the welder 15 and is energized when a welding sequence begins.

Current control 37 is also a portion of the weld control program 50 in ROM 35. To control current to the weld zone, current control 37 determines and controls the firing angle of the firing pulses F+ and F−. Although several different methods exist for compensating for wear of the contact tips, in the preferred embodiment, a stepper program is employed which will increase or boost the current in equal increments according to a user profile as specified by the programmed stepper. This profile generally will increment the current boost in discrete steps based on a number of weld cycles and is entered through the data entry interface 31 by a weld engineer.

Figure 3A:
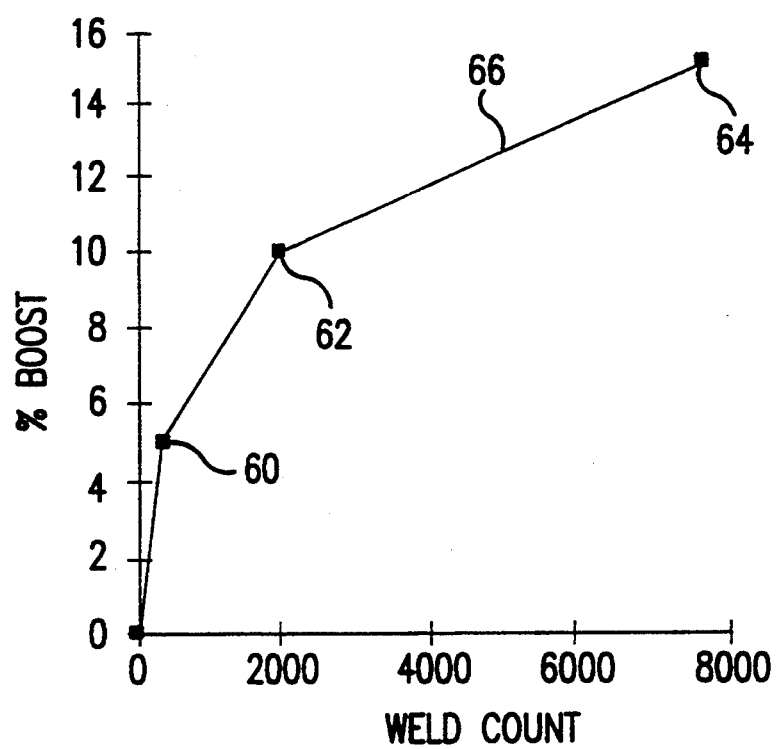
FIG. 3a is a graphical representations of a current stepper function illustrating the relationship between the number of welds and the current boost of the primary current of a welder transformer.

FIG. 3a shows a profile of current command boost or current set point boost as a function of the number of welds made. Weld gun contact tips are made of copper or a copper alloy for low impedance and high conductivity. As the contact tips are heated and under pressure while welding, they will tend to deform over time, decreasing the current density. A stepper program will compensate for the decreasing the current density by increasing the current by a fixed percentage after a predetermined number of weld cycles. During the first stage when new contact tips are first being used, weld current is increased by discrete increments every 40 weld cycles, until 200 weld cycles at point 60 have occurred. During the second stage, the current boost is programmed to reach ten percent at point 62 after 2000 weld cycles are reached. From 2000 to 8000 weld cycles, another 5 percent is added to reach a total fifteen percent current boost at point 64 which generally is considered as the end of life for the contact tips and time for maintenance and replacement. The resultant current or conduction angle boost results in a stepper profile 66. This stepper program can be adjusted empirically to achieve the appropriate current to compensate for contact tip wear.

Figure 3B:
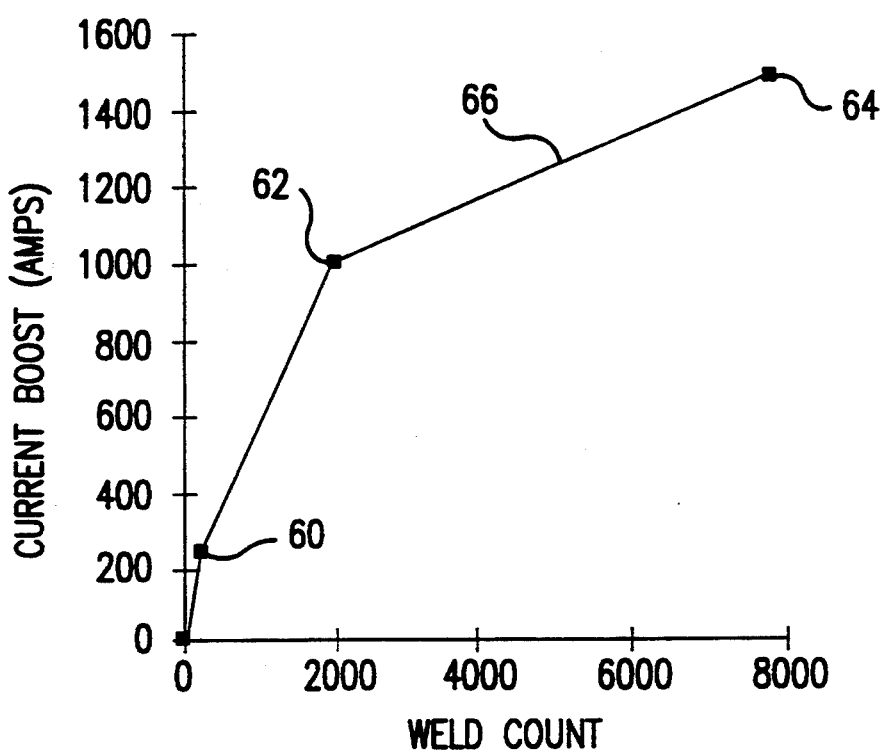
FIG. 3b is a graphical representations of a constant current stepper function illustrating the relationship between the number of welds and the primary current of a welder transformer.

In FIG. 3b, the stepper program of FIG. 3a graphically expresses the required current directly rather than as a percentage of current boost. Weld current values on stepper profile 66 are directly specified at each weld count and stepper current profile 66 can be programmed in the stepper control program 50 and the constant current control. Each point on stepper profile 66 therefore represents a nominal current value that the weld controller 11 will maintain constant throughout a its particular step. The same system could be used for different weld schedules, depending on the workpieces and contact tips being used at the time. Stepper profile 66 is user defined.

Figure 4A:
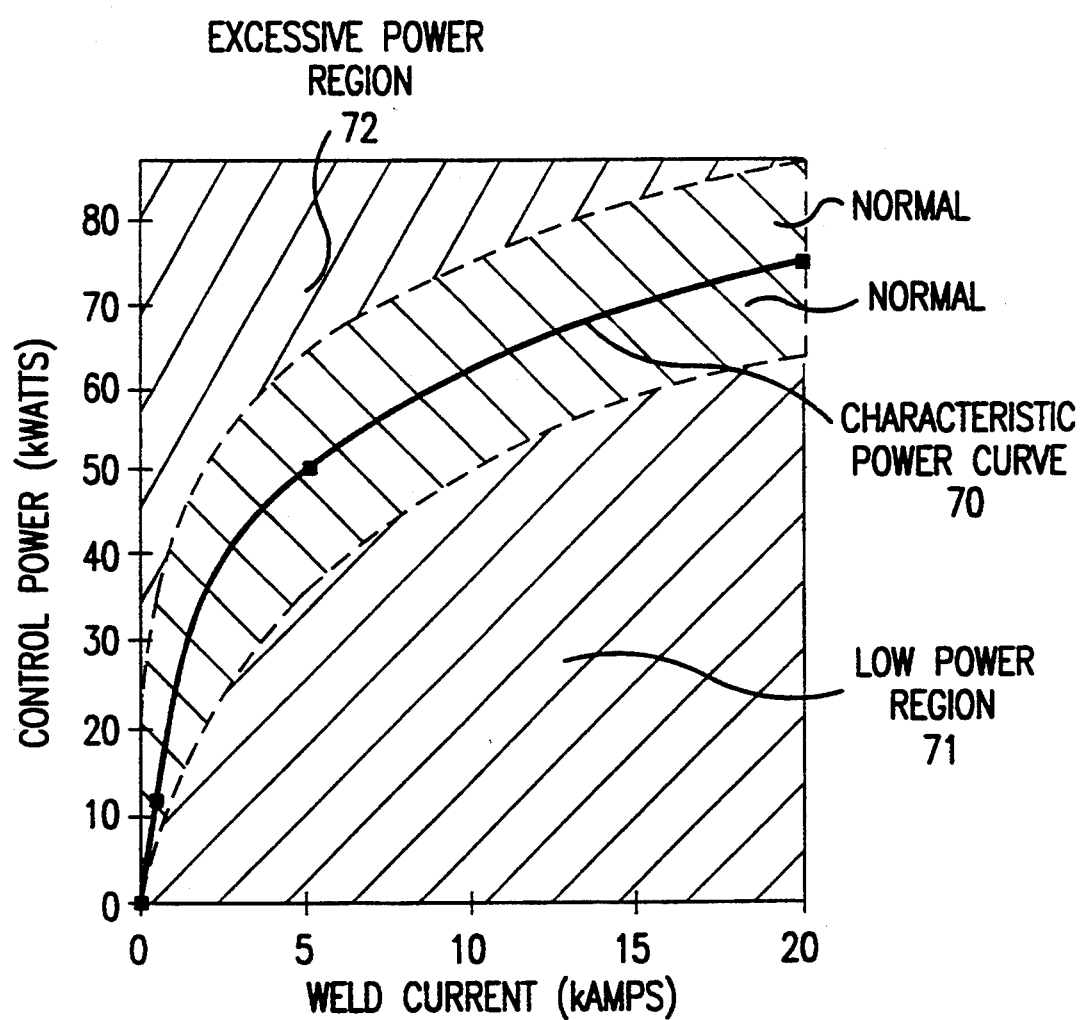
FIGS. 4a, 4b, and 4c are graphical representations of a characteristic power curve showing control power versus weld current.
Figure 4B:
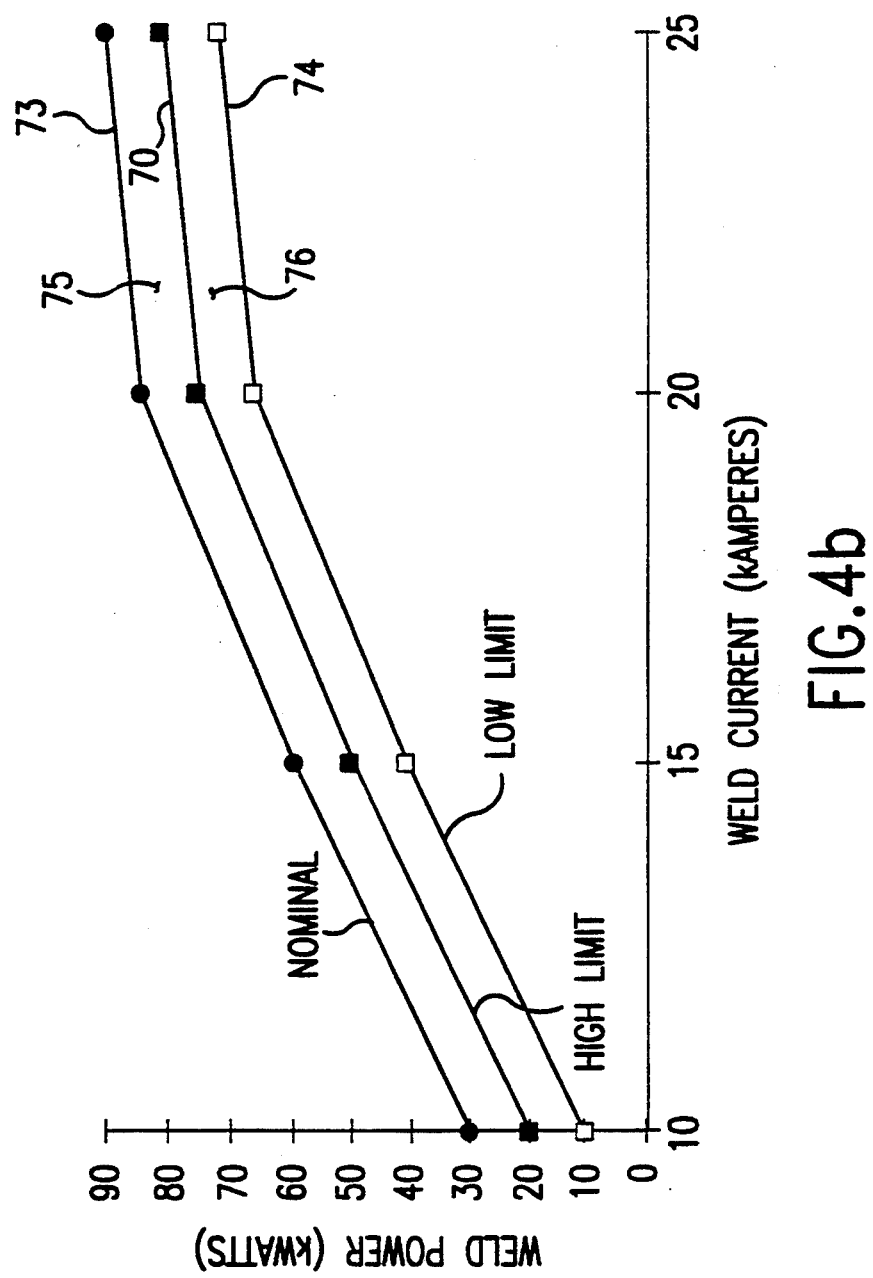
Figure 4C:
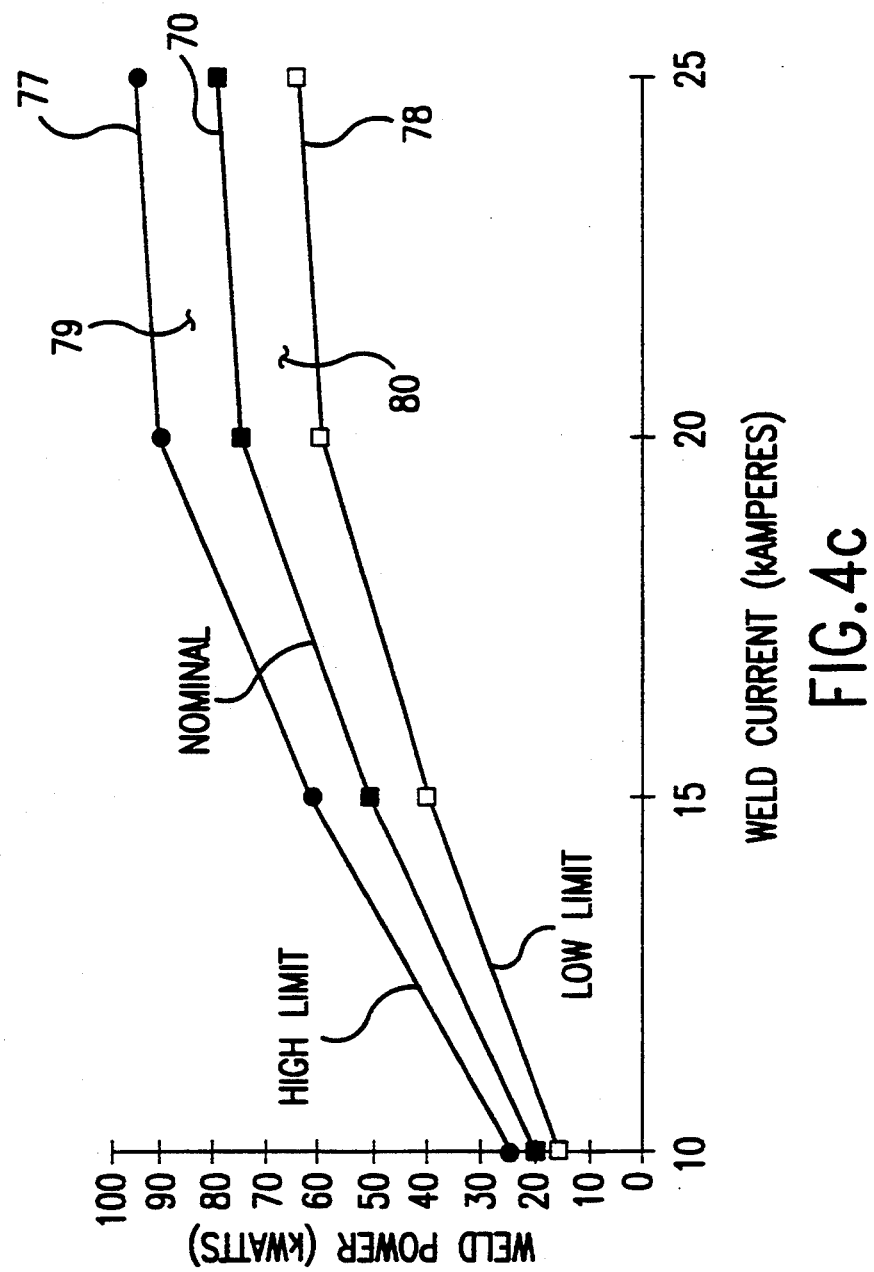

For the present invention, the stepper current profile is used in developing a characteristic power curve. Once a particular weld stepper profile is known, a table of values relating the power or Volt Amperes required to supply the primary or secondary current to welding transformer 17 at a particular step of the stepper program can be established. This can be related to a nominal or characteristic power curve 70 as depicted in FIG. 4a. A region or window surrounding the curve 70 can be established for normal variations and tolerance of the weld power. The weld controller then can compare the actual power with the established characteristic power curve 70 and generate an appropriate signal to indicate an event condition if the actual power is in a low power region 71 or excessive power region 72. This window surrounding the curve 70 can be based on a fixed offset or a proportional offset from the characteristic power curve 70 at both the high and low limits as shown in FIGS. 4b and 4c. The offset 75 between the upper limit 73 and the characteristic power curve 70, and the offset 76 between the lower limit 74 and the characteristic power curve 70 is fixed. This offset is entered through the data entry interface 31 by a weld engineer. In another version of the present invention, as shown in FIG. 4c, the upper 77 and lower 78 power limits follow or track the characteristic power curve 70, obtained as with the fixed offset method, by a fixed percentage of the nominal power characteristic curve 70. This percentage is also entered through the data entry interface 31. Both the offset limit and the proportional limit procedures enable the use of power limits to be established in close proximity to the nominal contact tip or welding power at the different weld currents.

Since the tooling providing the weld current can be quite complex, the Volt Amperes or power required to produce a given weld current can be difficult to predict. The present invention therefore has provisions for the weld controller 11 to learn the characteristic power curve 70 over the range of currents as specified by the combination of the programmed weld current and the range of current boost as specified by the stepper schedule. When this function is enabled, the weld controller 11 will automatically compute the power or Volt Amperes required to deliver the target current at the appropriate current boost, and build a table of values relating weld current and delivered power or Volt Amperes. Once this table is complete, which occurs when the weld controller 11 has completed a stepper schedule, the table is available for an operator 85 to edit, view, or copy into a characteristic power curve file 82 for the weld system. Assuming the welding system is new or refurbished, the resulting curve or profile will be an accurate representation of the characteristic power curve for that particular weld system, relating power or Volt Amperes to the weld current, and using a stepper program to compensate for contact tip deformation.

Figure 5:
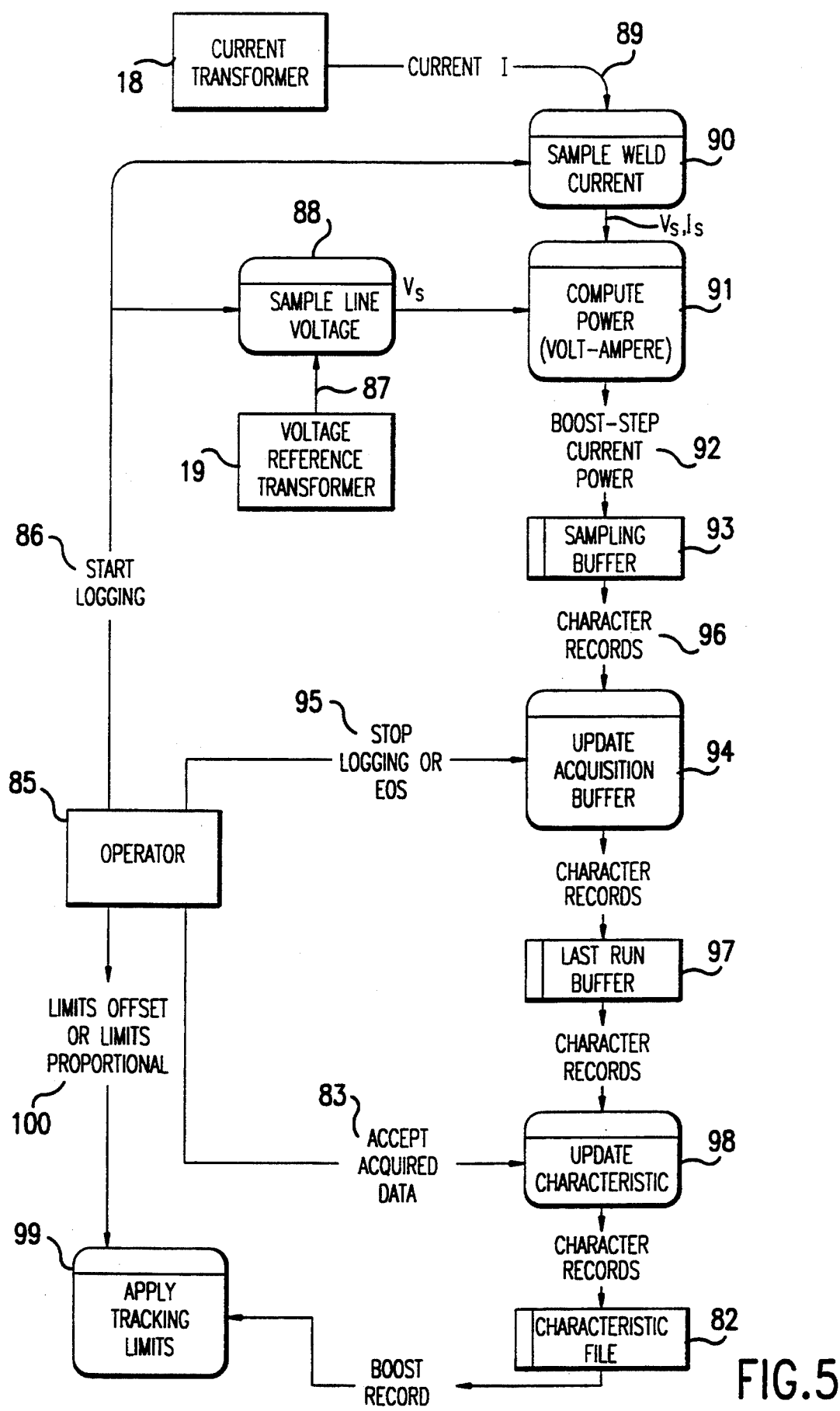
FIG. 5 is a dataflow diagram showing a system for generating and utilizing a characteristic power profile for use with the weld controller system implementing the progressive power control according to the present invention.

FIG. 5. provides an overview of the above operation of the preferred embodiment of the present invention for implementing the progressive power limit control utilizing a characteristic power profile for use with the weld controller system 11. The operator 85 can select a sampling mode for a data acquisition run for a particular, selected weld schedule. Various power sampling and logging modes are possible. An average mode will provide the average of all weld power samples in a boost step as representative of the nominal power for that step. A five sample minimum mode will compute and log the average of the five lowest weld power samples within the boost step. Other alternatives are possible since the invention is not restricted by a particular sampling and filtering mode. The logging mode allows the enabling or disabling of logging the weld power data and has two options for polypulse welding logging strategy. Polypulse welding uses multiple pulses in one welding sequence and the weld power data can be selected to accumulate only the first weld pulse of each weld sequence or the average of all weld pulses of each weld sequence. Once an operator 85 has selected sampling and logging modes and enabled or started 86 the logging of weld data through the data entry interface 31, weld line voltage 87 as measured by voltage reference transformer 19 located in the welder power module 13 is sampled 88. These samples are accumulated to form a single sample Vs for each current boost increment, according to the sampling and logging modes selected. For each corresponding current boost increment, weld current 89, as measured by current transformer 18 located in the welder power module 13 is also sampled 90. These samples are also accumulated to form a single sample Is for each heat boost increment, according to the sampling and logging modes selected. The system will calculate the positive and negative half cycle RMS weld current samples using a method as disclosed in commonly assigned U.S. Pat. No. 4,516.008. Using the Is and Vs samples, power will be computed 91 for the particular weld current boost step, either in real or complex terms. Each current boost increment power value 92 is written to a sampling buffer 93 at the next boost point of the stepper. The sampling buffer 93 will contain the power profile being constructed for the selected weld schedule while the power data is still being acquired. Update acquisition buffer routine 94, which is triggered by receipt of Stop Logging or End of Stepper (EOS) command 95 reads characteristic records 96 from sampling buffer 93 and writes characteristic records 98 to last run buffer 97.

Buffer 97 will always contain the most recently acquired set of nominal power profile data for a particular weld schedule. This data may be examined and modified by the operator 85 through the data entry interface 31. When logging is started, the sampling buffer 93 is reinitialized before any data is acquired. The last run buffer 97 is not initialized, and its data can be viewed or edited. If EOS 95 is encountered, the last run buffer 97 will be overwritten with data from the sampling buffer 93. During the data acquisition and logging operation for the selected weld schedule, the schedule is back filled from the lowest recorded current boost point to the zero boost point with the power recorded at the lowest observed boost point. On termination of the data acquisition and logging operation for the selected weld schedule, the schedule is forward extrapolated from the highest recorded current boost point and the midpoint of observed boosts to supply power records beyond the range of observed boosts. Data in the last run buffer 97 can only be transferred to the characteristic file 82 through action 83 by operator 85. This action is performed when the acquired data is ready. There will be an unique characteristic power profile 82 for each different weld schedule. Operator 85 can view and update 98 the characteristic file 82 to fine tune the power profile. This is also accomplished through the data entry interface 31 before accepting the nominal power profile generated by the data acquisition procedure.

Once a characteristic file 82 exists for a particular weld schedule, the operator 85 can select 99 the type of power limits desired and apply them to a tracking limit 100 for the weld schedule. Selecting OFFSET LIMITS enables the fixed offset limit mode of operation. The operator enters a minimum and maximum offset from the nominal power value for each current or current boost step. As an example, entering 10 for the minimum and 20 for the maximum sets the minimum power limit 10 kWatts below the nominal power value and the maximum power limit 20 kWatt above the nominal power value for each current or current boost step. Selecting PROPORTIONAL LIMITS enables the proportional limit mode of operation. The operator enters a minimum and maximum percentage of the recorded nominal power for each current or current boost step. For example, entering 90 for the minimum and 120 for the maximum sets the minimum power limit at 90 percent of the nominal power value and the maximum power limit at 120 percent of the the nominal power value for each boost step. Once the power limit mode is selected, the characteristic power file is then ready for use as a tracking power limit control during normal operation of the particular weld schedule for which it was generated. Characteristic power curve profiles for other weld schedules are generated in a similar manner. During normal operation, if the weld power is outside the selected power limits, the weld controller will declare an event occurrence. An event is an internal indication that a logical condition has been satisfied. The result of the event occurrence is dependant on the particular condition and could result in changing outputs, energizing light indicators, sending warning signals to other devices, or even terminating the weld process itself.

While the specific embodiments have been illustrated and described, numerous modifications are possible without departing from the scope or spirit of the invention. Additionally, implementation of the weld controller might utilize a secondary computer, which might be a personal computer. Although the progressive power limit control is described for use with a welder using a stepper control, the system could be adaptable for use with any type of system requiring constant current control following a progressive increase or decrease in operating power.

We claim:

1. A progressive power limit control system for use with a resistance welder having a weld transformer for supplying weld current to at least one pair of contact tips, said system comprising:
   A. a microprocessor;
   B. a stepper program operating in said microprocessor, said program for increasing said weld current in increments following a stepper current profile having a plurality of weld cycles;
   C. a current sensor for sensing said weld current, said current sensor for providing weld current data;
   D. a voltage sensor for sensing voltage supplied to said weld transformer, said voltage sensor for providing voltage data;
   E. means for calculating weld power from said current data and said voltage data at each of said plurality of weld cycles;
   F. means for comparing said calculated weld power with a characteristic power profile at each of said plurality of weld cycles, said characteristic power profile having an upper power threshold and a lower power threshold;
   G. means for indicating an event condition of said resistance welder if said calculated weld power exceeds said upper power threshold or is below said lower power threshold; and
   H. means for establishing said characteristic power profile at each of said plurality of weld cycles over a range of weld currents specified by said stepper program.

2. The progressive power limit control system of claim 1 wherein said establishing means of said characteristic power profile includes an acquisition run of said resistance welder using said stepper program to acquire multiple power data samples at each step of said stepper program, said acquisition run further including means for filtering said multiple power data samples to obtain a nominal weld power value at each step of said stepper current profile.

3. The progressive power limit control system of claim 2 wherein said acquisition run further including means for calculating said weld power from said voltage data and said weld current value at each step of said stepper current profile to obtain a nominal weld power value at each step of said stepper program.

4. The progressive power limit control system of claim 1 wherein said upper power threshold and said lower power threshold track said characteristic power profile by a predetermined power offset at each of said plurality of weld cycles.

5. The progressive power limit control system of claim 4 wherein said predetermined power offset between said characteristic power profile and said upper power threshold is a selectable value constant for each point of said stepper program and wherein said predetermined power offset between said characteristic power profile and said lower power threshold is a separately selectable value, said value constant for each point of said stepper program.

6. The progressive power limit control system of claim 4 wherein said predetermined power offset between said characteristic power profile and said upper power threshold is a selectable and fixed percentage value of said characteristic power profile for each point of said stepper program and wherein said predetermined power offset between said characteristic power profile and said lower power threshold is a separately selectable and fixed percentage value of said characteristic power profile for each point of said stepper program.

7. The progressive power limit control system of claim 1 wherein said weld current data is proportional to the RMS value of said weld current and said voltage data is proportional to the RMS value of said voltage supplied to said weld transformer.

8. The progressive power limit control system of claim 7 wherein said weld power calculating means computes said weld power in terms of Volt-Amperes.

9. The progressive power limit control system of claim 7 wherein said weld power calculating means computes said weld power in terms of Watts.

10. A weld controller having a progressive power limit control system for use with a resistance welder having a weld transformer for supplying weld current to at least one pair of contact tips to create heat between at least two workpieces, said weld controller having a plurality of welding cycles, said weld controller system comprising:
    A. a microprocessor;
    B. welder power means controlled by a program operating in said microprocessor and operatively connected to said weld transformer for supplying weld current to said contact tips to create said heat in said workpieces, said program for increasing said weld current in increments following a predetermined current profile having a plurality of weld cycles to provide compensation for deterioration of said contact tips wear;
    C. a current sensor for sensing current supplied by said welder power means to said weld transformer, said current sensor for providing weld current data;
    D. a voltage sensor for sensing voltage supplied to said weld transformer, said voltage sensor for providing voltage data;
    E. means for calculating weld power from said current data and said voltage data at each of said plurality of weld cycles;
    F. means for comparing said calculated weld power with a characteristic power profile at each of said plurality of weld cycles, said characteristic power profile having an upper power threshold and a lower power threshold;
    G. means for indicating an event condition if said calculated weld power exceeds said upper power threshold or is below said lower power threshold; and
    H. means for establishing said characteristic power profile at each of said plurality of weld cycles over a range of weld currents specified by said stepper program.

11. The weld controller system of claim 10 wherein said program includes a stepper program for increasing said weld current in a plurality of steps following a predetermined weld schedule to generate a predetermined stepper current profile, said stepper program for increasing said weld current in each of said plurality of steps by a predetermined increment after a predetermined number of weld cycles.

12. The weld controller system of claim 11 wherein said characteristic power profile is generated from an acquisition run of said weld controller using said stepper program to acquire multiple weld power data samples at each step of said stepper program, said acquisition run further including means for filtering said multiple weld power data samples to obtain a nominal weld power value at each step of said stepper program.

13. The weld controller system of claim 12 wherein said current sensor includes a current transformer coupled to said weld transformer and an analog to digital converter to produce said current data samples and said microprocessor converts said current data samples to digital representations of the RMS value of the weld current.

14. The weld controller system of claim 13 wherein said voltage sensor includes a potential transformer coupled to an input line voltage source for supplying power to said weld transformer and an analog to digital converter to produce said voltage data samples and said microprocessor converts said voltage data samples to digital representations of the RMS value of the weld voltage.

15. The weld controller system of claim 14 wherein said acquisition run further including means for calculating said weld power from said nominal voltage data and said weld current value at each point of said stepper current profile to obtain a nominal weld power value at each point of said stepper program.

16. The weld controller system of claim 15 wherein said upper power threshold and said lower power threshold track said characteristic power profile by a predetermined power offset at each of said plurality of weld cycles.

17. The weld controller system of claim 15 wherein said predetermined power offset between said characteristic power profile and said upper power threshold is a selectable value constant for each point of said stepper program and wherein said predetermined power offset between said characteristic power profile and said lower power threshold is a separately selectable value, said value constant for each point of said stepper program.

18. The weld controller system of claim 15 wherein said predetermined power offset between said characteristic power profile and said upper power threshold is a selectable and fixed percentage value of said characteristic power profile for each point of said stepper program and wherein said predetermined power offset between said characteristic power profile and said lower power threshold is a separately selectable and fixed percentage value of said characteristic power profile for each point of said stepper program.

19. The weld controller system of claim 15 wherein said acquisition run further includes means to modify said characteristic power profile, including means to modify said nominal weld power value at each point of said stepper program.

20. The weld controller system of claim 15 wherein said acquisition run further includes means to associate a weld power value on said characteristic power profile with said nominal weld current value at each step of said stepper program.

21. The weld controller system of claim 15 wherein said weld current data is proportional to the RMS value of said weld current and said voltage data is proportional to the RMS value of said voltage supplied to said weld transformer.

22. The weld controller system of claim 21 wherein said weld power calculating means computes said weld power in terms of Volt-Amperes.

23. The weld controller system of claim 21 wherein said weld power calculating means computes said weld power in terms of Watts.

* * * * *